(12) United States Patent
Fagg et al.

(10) Patent No.: US 8,661,118 B2
(45) Date of Patent: Feb. 25, 2014

(54) DETECTION OF END-TO-END TRANSPORT QUALITY

(75) Inventors: Graham Edward Fagg, Monroe, WA (US); Rajneesh Mahajan, Bellevue, WA (US); Moshe Zilberstein, Kirkland, WA (US); Guatam Swaminathan, Kirkland, WA (US); Costin Hagiu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 12/719,669

(22) Filed: Mar. 8, 2010

(65) Prior Publication Data

US 2011/0219112 A1    Sep. 8, 2011

(51) Int. Cl.
*G06F 15/173* (2006.01)
(52) U.S. Cl.
USPC ........... 709/224; 709/203; 709/223; 370/250; 370/252
(58) Field of Classification Search
USPC .......... 709/230, 200, 203, 223, 224; 370/250, 370/252; 455/67.11
See application file for complete search history.

(56) References Cited

U.S. PATENT DOCUMENTS

| | | | |
|---|---|---|---|
| 6,487,218 B1 * | 11/2002 | Ludwig et al. | 370/469 |
| 7,003,290 B1 * | 2/2006 | Salonaho et al. | 455/423 |
| 7,162,011 B2 * | 1/2007 | Kolligs et al. | 379/1.04 |
| 7,336,618 B2 * | 2/2008 | Bennett | 370/252 |
| 7,499,515 B1 | 3/2009 | Beadle | |
| 7,610,385 B2 * | 10/2009 | Hundal et al. | 709/227 |
| 7,912,419 B2 * | 3/2011 | Lee et al. | 455/67.13 |
| 2004/0158644 A1 * | 8/2004 | Albuquerque et al. | 709/238 |
| 2005/0118959 A1 * | 6/2005 | Johan et al. | 455/67.11 |
| 2006/0084390 A1 * | 4/2006 | Salonaho et al. | 455/67.11 |
| 2007/0064614 A1 * | 3/2007 | Kataoka | 370/250 |
| 2007/0206621 A1 | 9/2007 | Plamondon et al. | |
| 2008/0080553 A1 * | 4/2008 | Hasty et al. | 370/468 |
| 2008/0225728 A1 | 9/2008 | Plamondon | |
| 2009/0252053 A1 | 10/2009 | Leith et al. | |
| 2011/0007660 A1 * | 1/2011 | Bae | 370/252 |
| 2011/0255429 A1 * | 10/2011 | Carrera et al. | 370/252 |

OTHER PUBLICATIONS

Lubonski, M. et al., "A Conceptual Architecture for Adaptation in Remote Desktop Systems Driven by the User Perception of Multimedia," 2007, 6 pages, downloaded at http://www-staff.it.uts.edu.au/~simmonds/Papers/APCC05_Marcin.pdf.

(Continued)

*Primary Examiner* — Ramy Mohamed Osman
(74) *Attorney, Agent, or Firm* — Henry Gabryjelski; Kate Drakos; Micky Minhas

(57) ABSTRACT

In various embodiments, methods and systems are disclosed for the real time detection of network conditions in conjunction with a remote presentation protocol. The link quality may represent the quality of the end-to-end connection between client and server with upper and lower bounds on the injection of additional traffic used for measurement. In some embodiments, the measurement technique may be selected based on the type of measurement that is desired. Accuracy may be maintained by selecting the type of measurement used based on current and previous network conditions. In one embodiment, a state model is used to determine the frequency of measurement and to determine when the measurements have produced a stable estimate of the link quality.

20 Claims, 22 Drawing Sheets

(56) References Cited

OTHER PUBLICATIONS

Lubonski, M. et al., "An Adaptation Architecture to Improve User-Perceived QoS of Multimedia Services for Enterprise Remote Desktop Protocols," 2005, 10 pages, downloaded at http://epress.lib.uts.edu.au/research/bitstream/handle/10453/2482/2005001005.pdf?sequence=1.

Prasad, R. et al., "Bandwidth Estimation: Metrics, Measurement Techniques, and Tools," Dec. 2003, 9 pages, downloaded at http://xoomer.virgilio.it/specialtlc/bwest_survey.pdf.

Kim, K-H. et al., "On Accurate and Asymmetry-aware Measurement of Link Quality in Wireless Mesh Networks," 2003, 14 pages, downloaded at http://www.eecs.umich.edu/~kyuhkim/papers/ToN08Kim.pdf.

* cited by examiner

DETECTION OF END-TO-END TRANSPORT QUALITY

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource. Protocols such as RDP typically handle graphics, device traffic such as USB, printer keyboard and mouse and in addition, virtual channels for application between server and a client. The terminal server hosts client sessions which can be in hundreds in a typical server configuration.

In a remote/virtual desktop environment, the amount of remote presentation data being transmitted can vary during the course of a remote user session. Such a remote session may be established over a network link and the type of data exchanged with the remote user device may include graphics, audio and other types of data. the link quality between client and server may vary in bandwidth, latency and/or loss. Remote presentation protocols typically rely on fixed/static sized buffers for networking traffic and if these are incorrectly sized they lead to either insufficient network usage or excess queuing in the network, both of which negatively affect user experience.

SUMMARY

In various embodiments, methods and systems are disclosed for the accurate, bounded, real time detection of current network conditions while working in conjunction with a remote presentation protocol such as RDP. The link quality may be reliably determined in real-time or near real-time so that the system may make adjustments as need. The link quality may represent the quality of the end-to-end connection between client and server with upper and lower bounds on the injection of additional traffic used for measurement. In some embodiments, the measurement technique may be selected based on the type of measurement that is desired. Accuracy may be maintained by intelligently selecting the type of measurement used based on current and previous network conditions. In one embodiment, a state model is used to determine the frequency of measurement and to determine when the measurements have produced a stable estimate of the link quality.

DETAILED DESCRIPTION

Computing Environments In General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
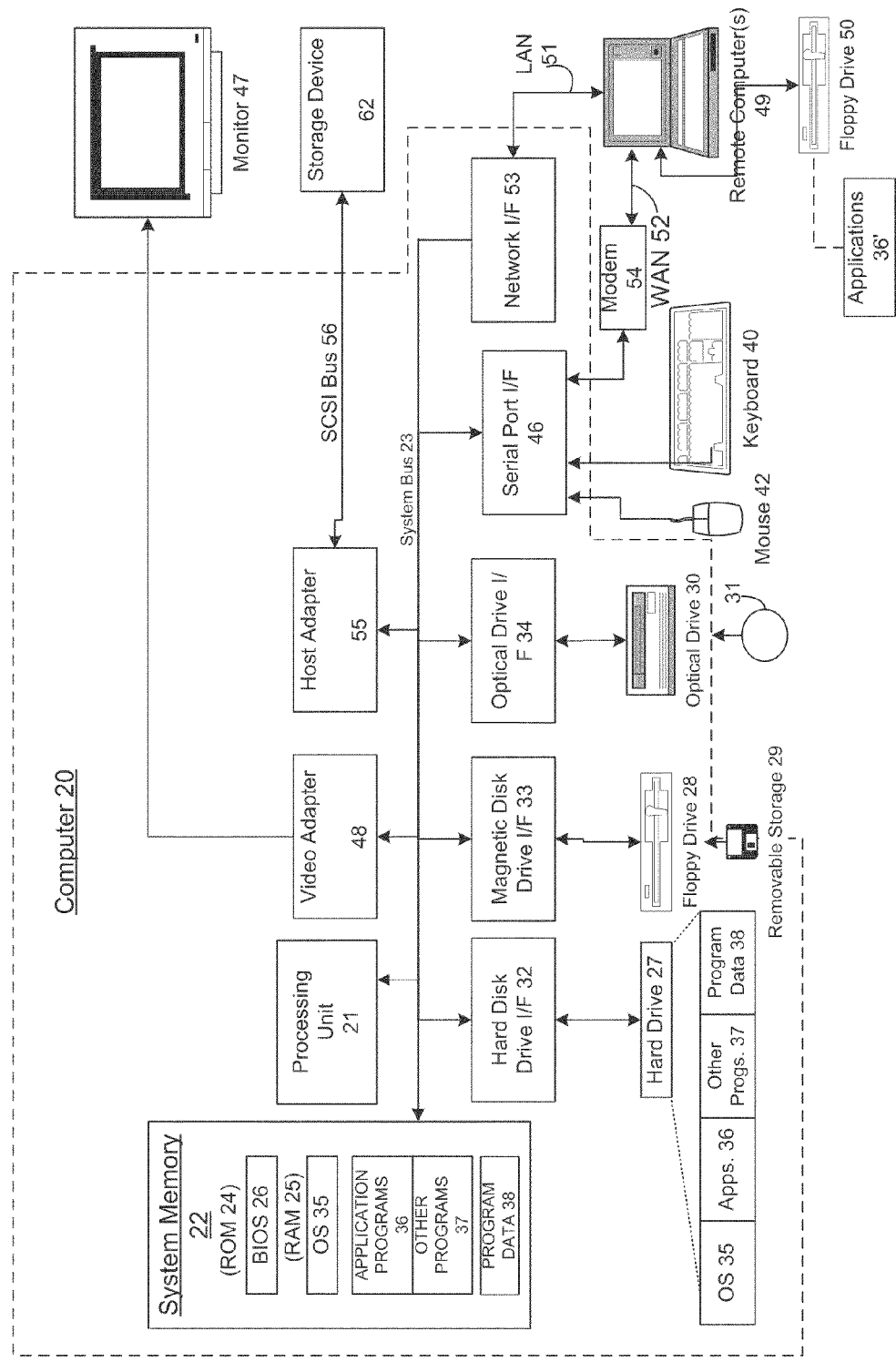
FIGS. 1 and 2 depict an example computer system wherein aspects of the present disclosure can be implemented.
Figure 2:
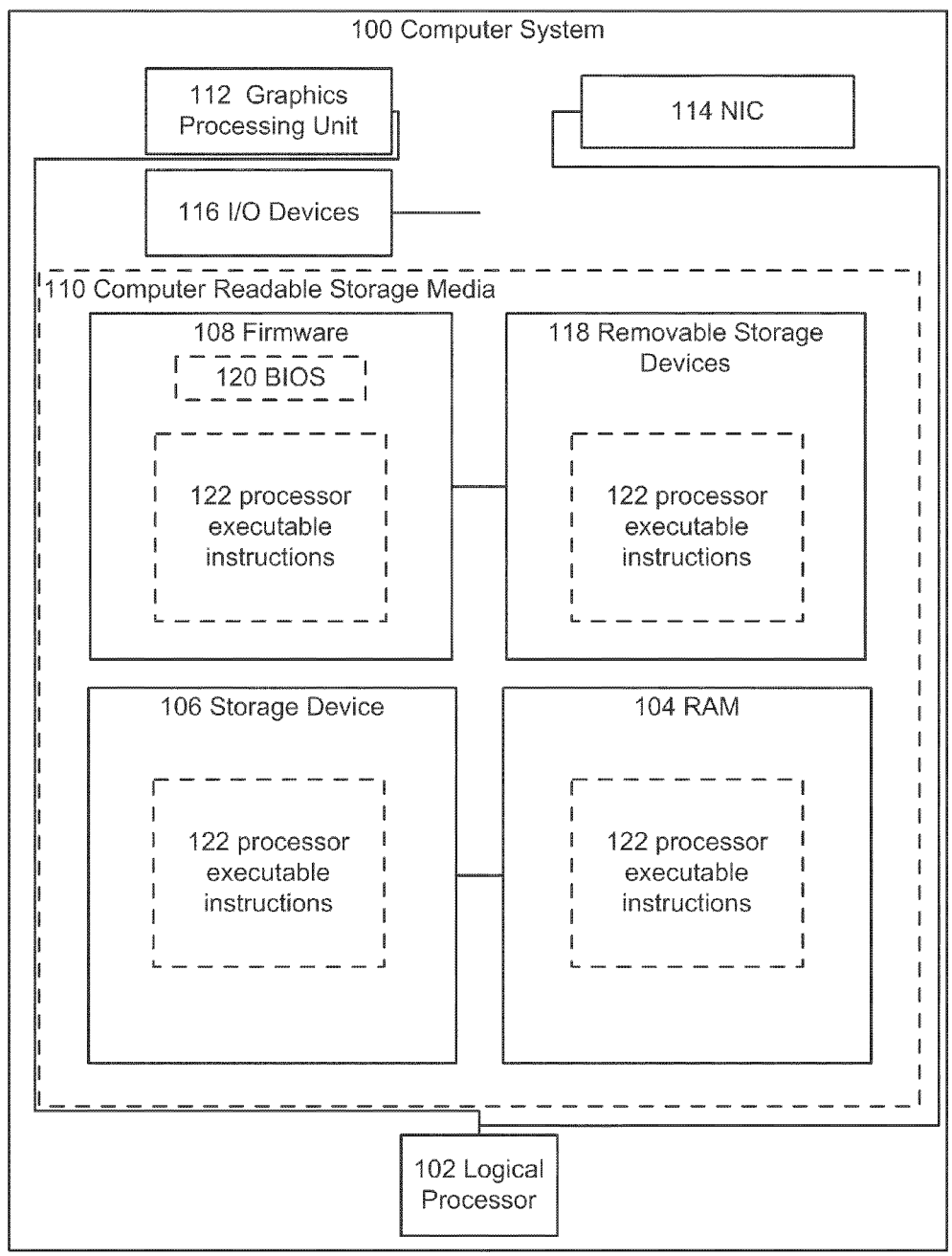

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
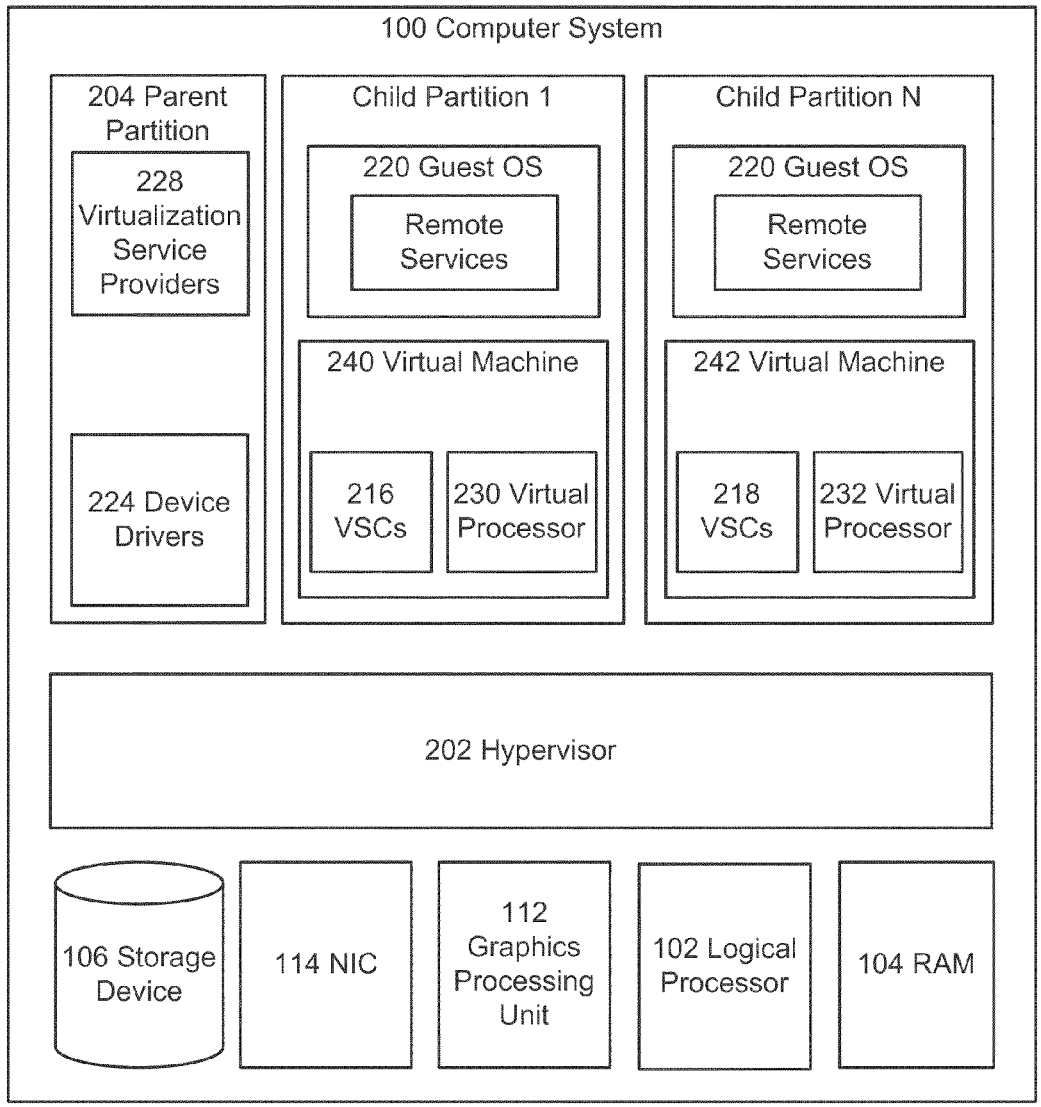
FIG. 3 depicts an operational environment for practicing aspects of the present disclosure.
Figure 4:
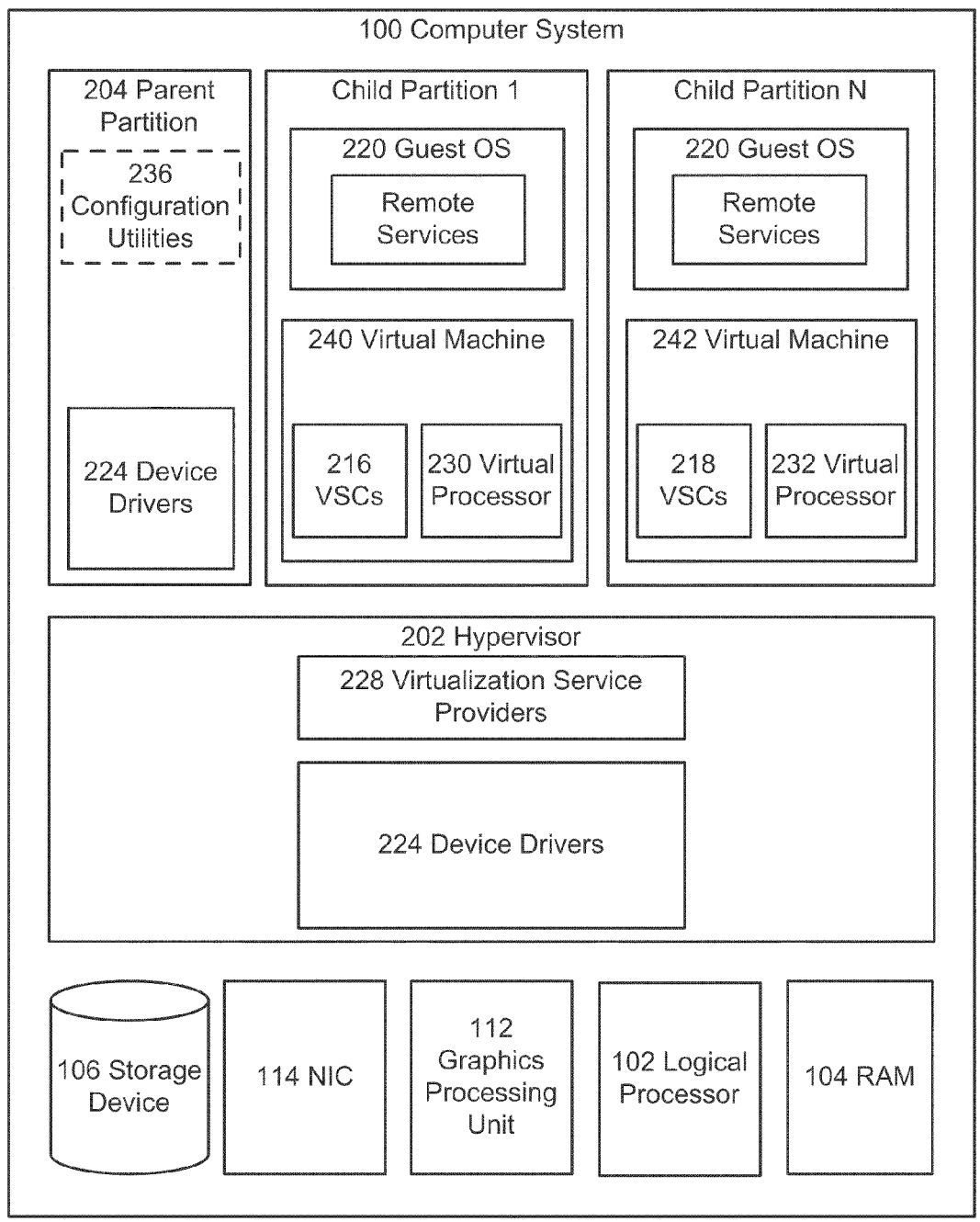
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
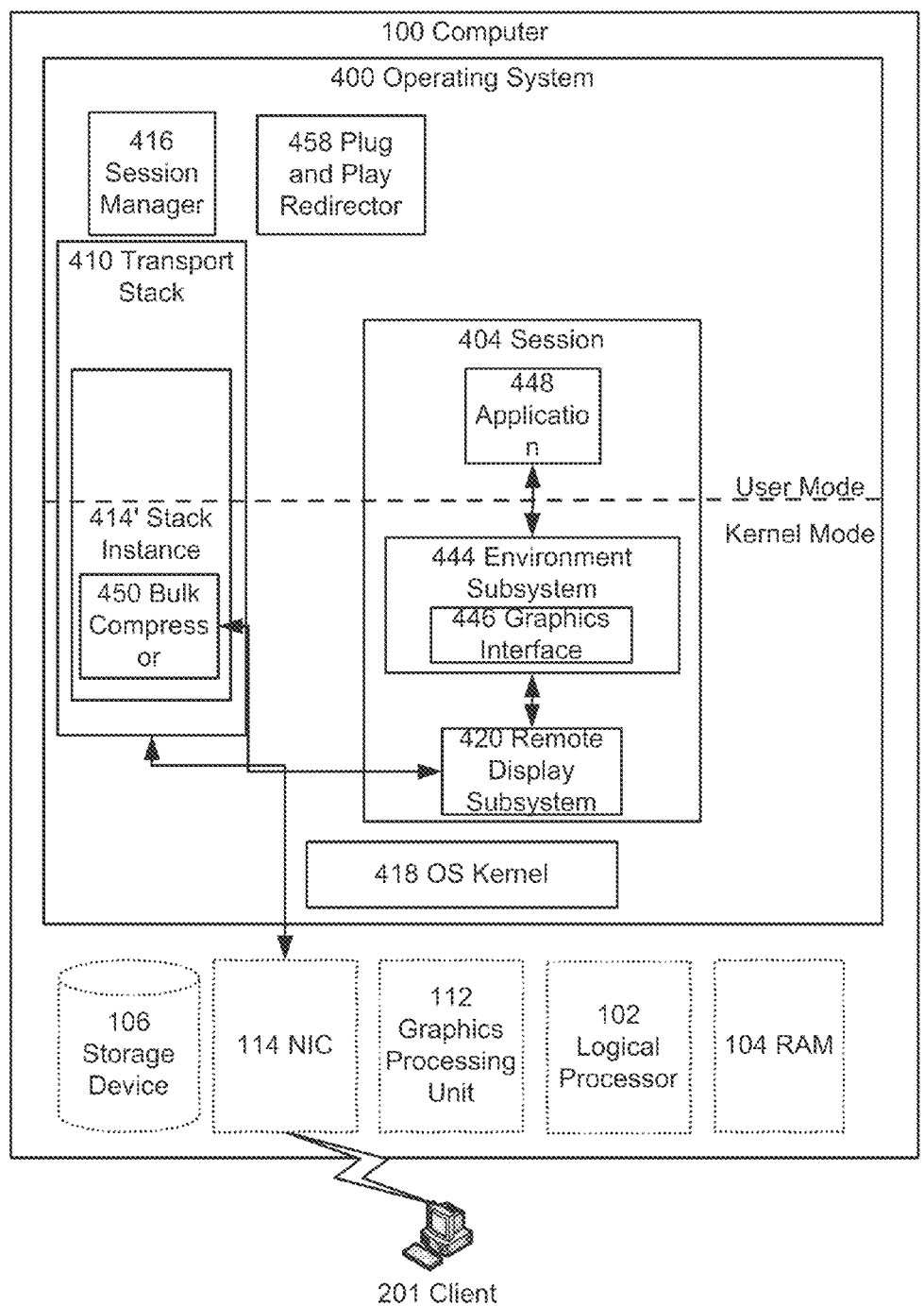
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
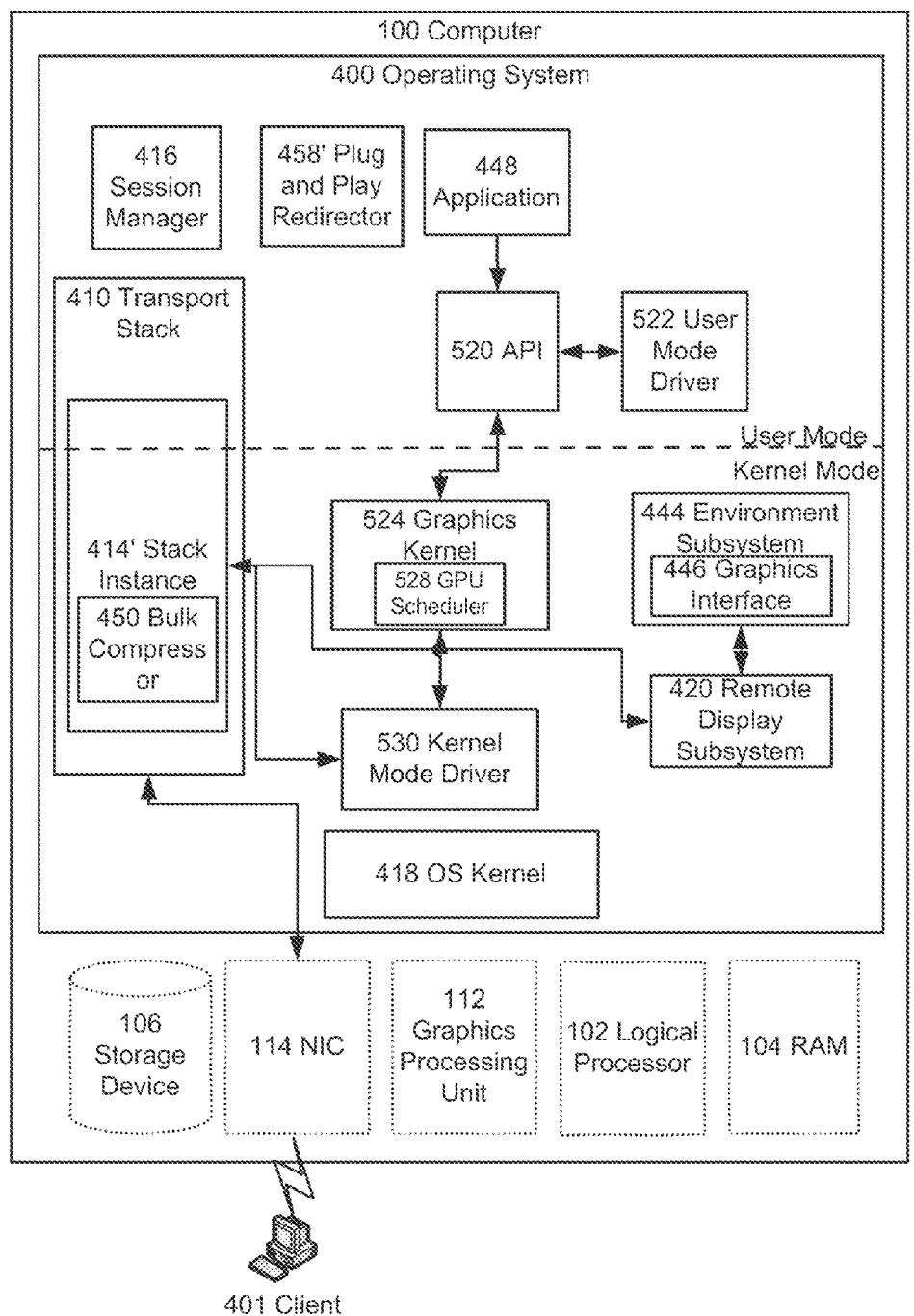
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Detection of Link Quality

In various methods and systems disclosed herein, improvements to the transmission of remote presentation graphics data to a client computer may be implemented to provide a more timely and rich user experience. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

In remote desktop scenarios the graphics content of a user's desktop located on a host computer (e.g., the server) is typically streamed to another computer (e.g., the client). The server and the client will exchange the desktop graphics data in a well defined protocol or format. Microsoft's™ Remote Desktop Protocol (RDP) is an example of such a protocol. The RDP protocol is a stream oriented protocol that may use a stream based transport such as the Transmission Control Protocol (TCP) for exchanging data with the client. Protocols such as the TCP protocol typically exhibit high latency especially when the underlying transport is a wide area network (WAN) connection. If such a link is used for RDP traffic, such latencies may result in a negative user experience because the desktop graphics data may be delivered to the client in a time delayed fashion.

In a remote/virtual desktop environment, the amount of RDP data being transmitted can vary during the course of a remote user session. Such a remote session may be established over a network link and the type of data exchanged with the remote user device may include graphics, audio and other types of data. the link quality between client and server may vary in bandwidth, latency and/or loss. Remote presentation protocols typically rely on fixed/static sized buffers for networking traffic and if these are incorrectly sized they lead to either insufficient network usage or excess queuing in the network, both of which negatively affect user experience.

If the connection is a local area network within, for example, a workspace infrastructure, then typically the bandwidth is predictable and sufficient. But in a wide area network, the connection may encompass a number of network devices and the bandwidth may be restricted at various points. For example, a number of modems and internet service providers may be part of the communications link. Since the link quality is constantly changing, it is difficult for even a knowledgeable end-user to predetermine what that quality is. The result is that the available bandwidth and latency is unpredictable and in some cases insufficient to adequately support a remote user session. It would be desirable in such cases to determine the quality of the link and, based on the link qualities, the upper remote session layers can be informed and can adjust the type and amount of data being sent.

A communications link is typically characterized by latency and bandwidth. Such characteristics may be measured in a controlled environment, but this is typically not possible in an end-to-end session over a wide area network. In some cases a method known as "ping-pong" may be used to measure the round-trip time but such methods are intrusive and require traffic flow to be stopped. Furthermore, since remote presentation data traffic can be routed through various protocols, it is difficult to determine the link quality by reading existing metrics. However, by knowing the link quality, a remote presentation system may regulate the data flows and ensure a better user experience.

In various embodiments methods and systems are disclosed for the accurate, bounded, real time detection of current network conditions while working in conjunction with a remote presentation protocol such as RDP. The link quality may be reliably determined in real-time or near real-time so that the system may make adjustments as need. The link quality may represent the quality of the end-to-end connection between client and server with upper and lower bounds on the injection of additional traffic used for measurement. In some embodiments, the measurement technique may be selected based on the type of measurement that is desired. Accuracy may be maintained by intelligently selecting the type of measurement used based on current and previous network conditions. In one embodiment, a state model is used to determine the frequency of measurement and to determine when the measurements have produced a stable estimate of the link quality.

In an embodiment, an integrated control state model may be used to maintain upper and lower bounds on how often detection/measurement is performed to improve accuracy while reducing unnecessary overhead. The control state model may appear as a network consumer that determines which measurements are to be injected into the networking stream and when the measurements are to be performed. The control state model may allow for normal remoting traffic to act as the network measurement probe. In one embodiment, an extensible measurement request-reply packet may be added to a remote presentation protocol that allows for various network measurements using a plurality of methods. Measurement may be taken at the remote presentation protocol (application) layer to allow for complete end-to-end measurements. In some embodiments, a chaining auto-detect mechanism can be implemented such that the results of two separate instances used for different remote presentation connections can be combined.

As mentioned previously, in many cases the remote presentation application does not have a reliable measure of the link quality. Some protocols may provide for an indication from the user. However, the hint may not be used by end-users and may be incorrectly set. Furthermore, such hints are static and do not reflect the dynamic underlying network conditions.

In various systems and methods, disclosed are mechanisms for providing for the measurement of remote presentation data traffic as the data flows from the source (e.g., the server) to the consumer (e.g., the client/end user). In one embodiment, the mechanism may comprise three components:
(a) a networking layer; its timers, and a designated remote protocol packet.
(b) a control algorithm based on a set of state models.
(c) calculation/estimate algorithms that perform the measurement and historical value transformation to a current network characteristics estimate.

In an embodiment, the networking layer may consist of functions at the server and the client such that both perform timing on networking packet streams when requested. The client and server may also flush (immediately send) pending data. Additionally, the remote presentation protocol may be augmented with a measurement request and reply packet that allows for sender and/or receiver side measurement of transmission times.

The measurement method may include ping-pong, payload weighted ping-pong, packet pairing and packet pairing with payload. Depending on the current network conditions, some of the methods may be more accurate than others. By providing for flexibility in selecting the measurement method, the total number of measurements may be reduced. Additionally, interfacing with the networking data stream may allow for the use of already pending remoting traffic to act as the measurement payload, thus allowing for increased accuracy of available network bandwidth.

The control algorithm may comprise a state model based on the current states of the bandwidth and latency estimates. In an embodiment, the measurement states may start at an unstable state and migrate to either a state or a not needed (or high) state depending on actual real time measurements. A progressive time and traffic based decay function may reduce the stable state to the unstable state to allow for both upper and lower bound measurement rates. The control algorithm may use these states for latency and bandwidth estimation. The algorithm may use the estimates and pending remote traffic to determine which measurement packet(s) to inject into the networking stream.

The calculation/estimation algorithms may take the latest measurement values and historical values for measurements and update the current estimates for the latency and bandwidth. The estimator may also update the confidence or stability of each measurement state. The changes may use an integral approximation to update values using the form: new=old+(error*factor). In one embodiment the factor may be 1/10.

The end-to-end transport quality determination function thus monitors the end to end throughput of a communications channel and estimates both the current average achievable bandwidth and latency as well as the maximum possible link bandwidth. Those skilled in the art will recognize that such end to end measurement techniques are not limited to remote presentation sessions and can be applied to any situation in which an end to end link quality assessment is desired, in particular in contexts such as wide area networks in which the presence of intermediate network nodes introduce some unpredictability or uncertainty in the end to end link quality. By determining the link quality, the run-time tuning of a communication may be adjusted to provide the best performance given the current network conditions.

Those skilled in the art will readily recognize that each particular component of the end-to-end transport quality determination function may be distributed and executed by the client and servers and other components in the network. For example, the function may comprise three additional server components, one new server to client protocol data unit (PDU), one client to server PDU, an additional field in the client information PDU, and an additional component on the client.

The network PDU may be in the form of a Request Acknowledgement (ReqACK) PDU that is sent from the server to the client and echoed back by the client. This allows the measurement of latency and bandwidth via multiple commonly deployed methods that can involve timers at both the server and the client. When used as a ping-pong echo packet, the ReqACK PDU can be used for Connect-Time Detection (CTD) of latency for use in deciding whether or not to utilize one or more graphics sources.

In one embodiment, the following changes may be implemented in the remote presentation protocol to enable continuous bandwidth detection: a server to client PDU; a Reply Request PDU, a client to server PDU, and an ACK Response PDU. A field in the Client Information PDU may be included that indicates that the new PDU is supported. The may indicate support, and the server can be configured so that it will not generate the new packets unless the client indicates support.

Figure 7:
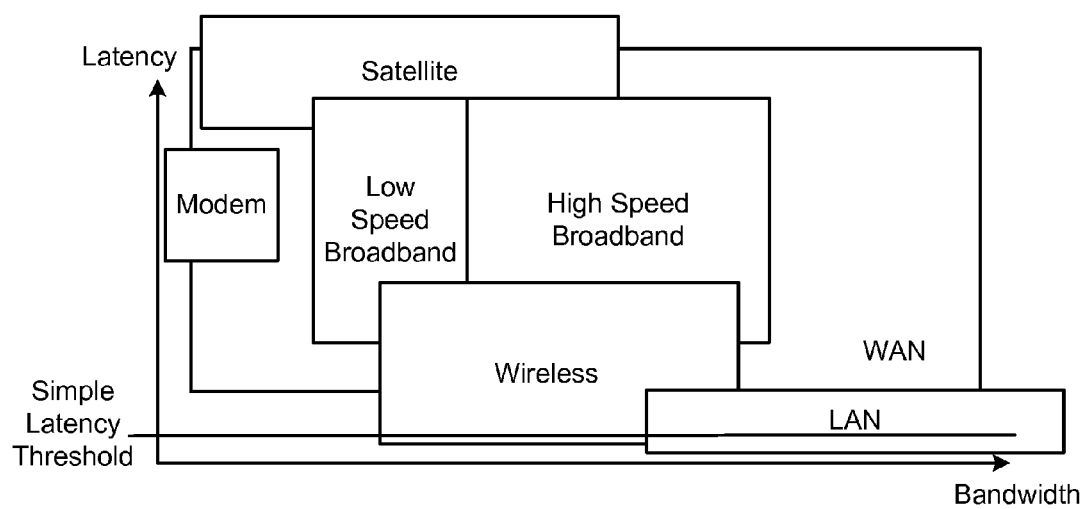
FIG. 7 illustrates examples of bandwidth and latency for various communications methods.

Network connections may be characterized on two dimensions: bandwidth and latency. Networks may be classified depending on both dimensions, as shown in FIG. 7. Network experience may be improved by setting the level of network buffering based on an accurate measurement of latency and bandwidth. It is preferable to use both latency and bandwidth because, for example, using a latency only threshold as show in FIG. 7 does not allow for differentiation between high speed wireless and a wired LAN connection. For any cases which are not high bandwidth and low latency for which the remote presentation protocol has sufficient throughput, both latency and bandwidth should be measured to calculate the network latency bandwidth product.

Figure 8:
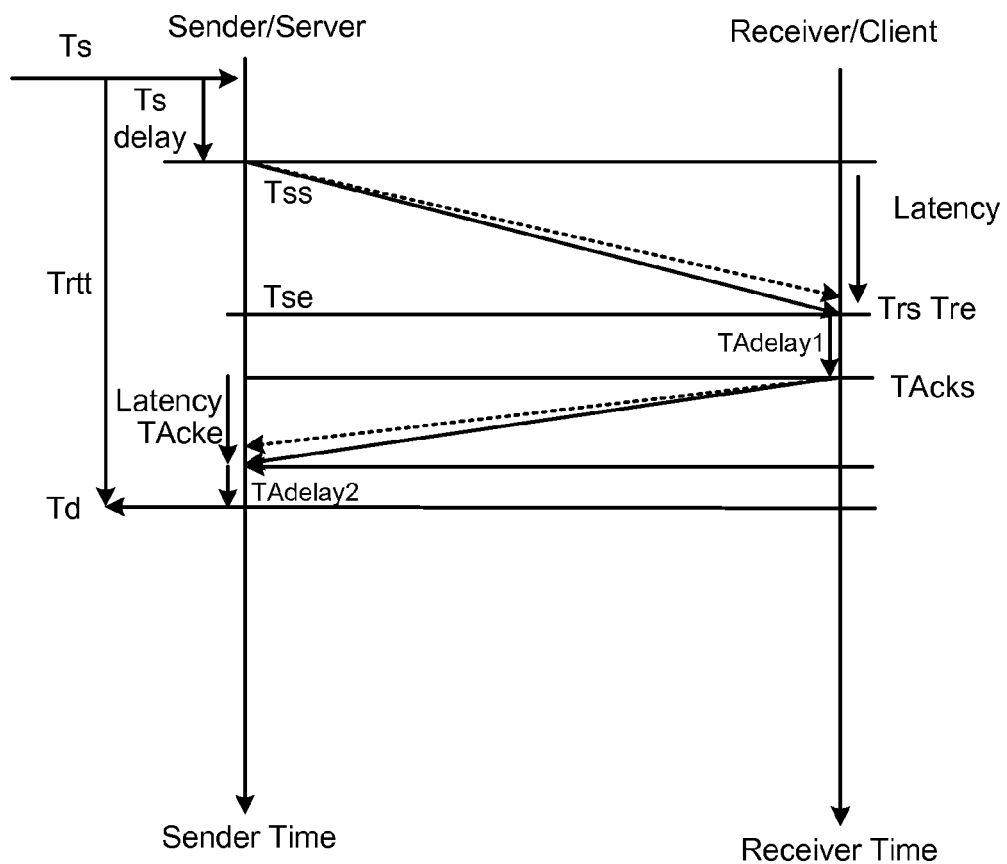
FIGS. 8-19 illustrate an overview of some of the processes disclosed herein.

Latency measurement may be performed using two methods: an active and a passive method. The active method is similar to that of the common internet tool "ping." In this method the small reply request packet is injected into the stream of outgoing graphics data and the time for how long it takes to be acknowledged by the client is measured as shown in FIG. 8. As shown in FIG. 8, the round trip time (RTT) divided in half provides an approximation of the one way network latency. Also shown are several overhead items in the system that effect the measurement such as TSdelay (the sum of the server (sender) injecting the packet into the network and TAdelay1 as the sum of all processing delays at the client (receiver)).

In the passive measurement method, the request and reply transactions can be timed explicitly between the server and the client.

Figure 9:
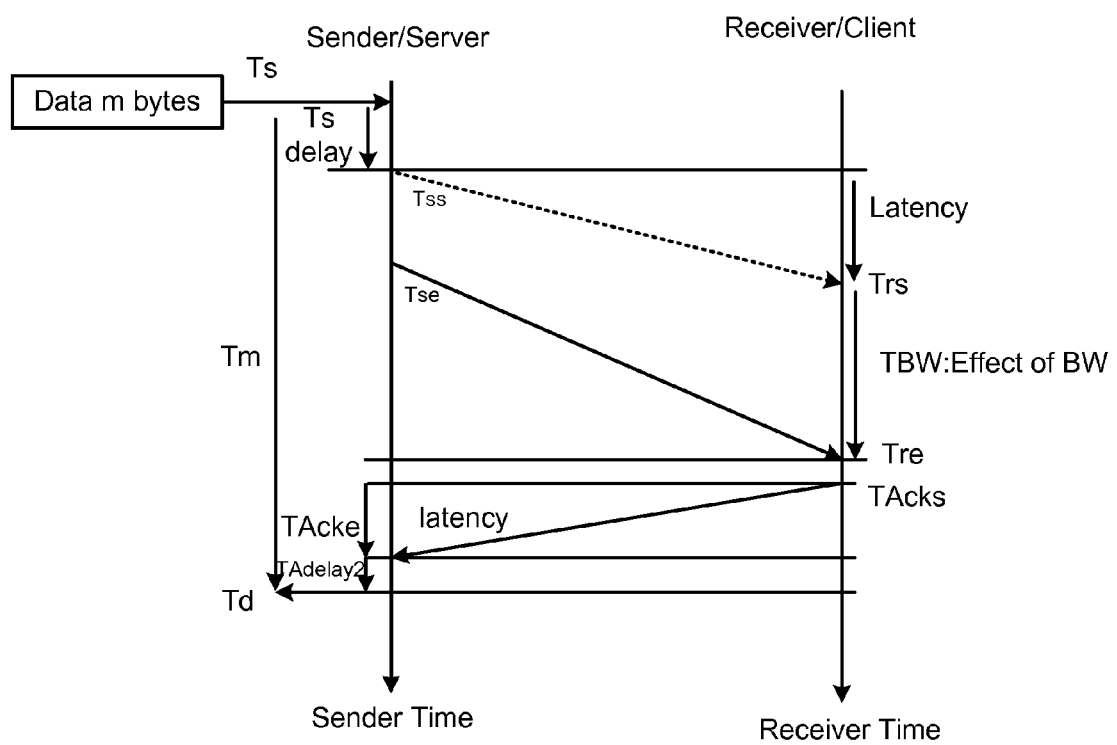

Referring to FIG. 9, illustrated is an example of a method for measuring bandwidth on the sender side. This form of measurement may be viewed as a form the method wherein a set of packets are echoed back to the sender, i.e., only one side sends a payload and the other sends an acknowledgement. This method is used because:

(1) many broadband systems have slower uplink connections that are prone to flooding;
(2) the payload would have to be handled by a terminal services server;
(3) a measurement can be based on current server to client traffic (graphic updates). Unless there is sufficient virtual channel traffic (file sharing, printing, etc.) there is typically not enough client-to-server payload to allow for an accurate measurement.

In one embodiment the model used to estimate the available bandwidth may be based on a modified Hockney model (non linear—non asymptotic profile).

In an embodiment, the measurement method for bandwidth on the receiver side may be a modified packet pairing algorithm. In packet pairing two consecutive packets may be timed for their separation at the receiver. The algorithm may be used for detecting contention on a network, but has three major requirements: accurate injection of pairs of packets at the sender, high quality timers on the receiving end, and a long sequence of measurements with complex filtering and fitting to produce a reasonably accurate measurement. By measuring larger packets rather than single packet dispersion, the requirements can be reduced while providing an accurate measurement.

Figure 10:
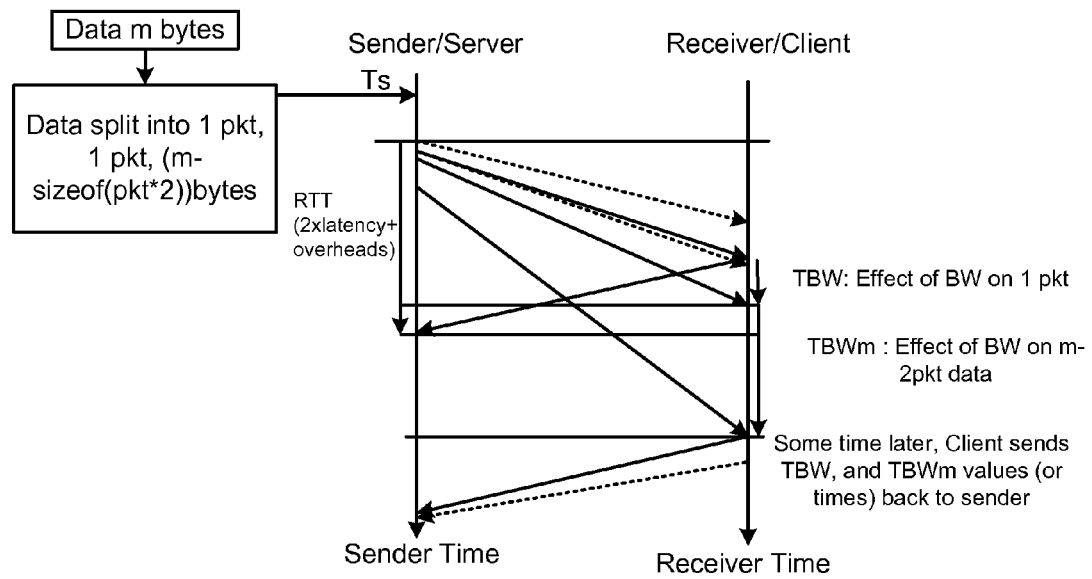

Depicted in FIG. 10 is one example of packet pairing (for network contention detection) and receiver side measurement combined. The Reply Request PDU may be used to support both methods using its flags field. In this method, packets are injected at the sender and timed at the receiver. Bandwidth can be calculated without the need for accurate latency values. If immediate acknowledging is enabled on the client, both a RTT latency calculation can be measured as well as a full payload Hockney measurement.

Figure 11:
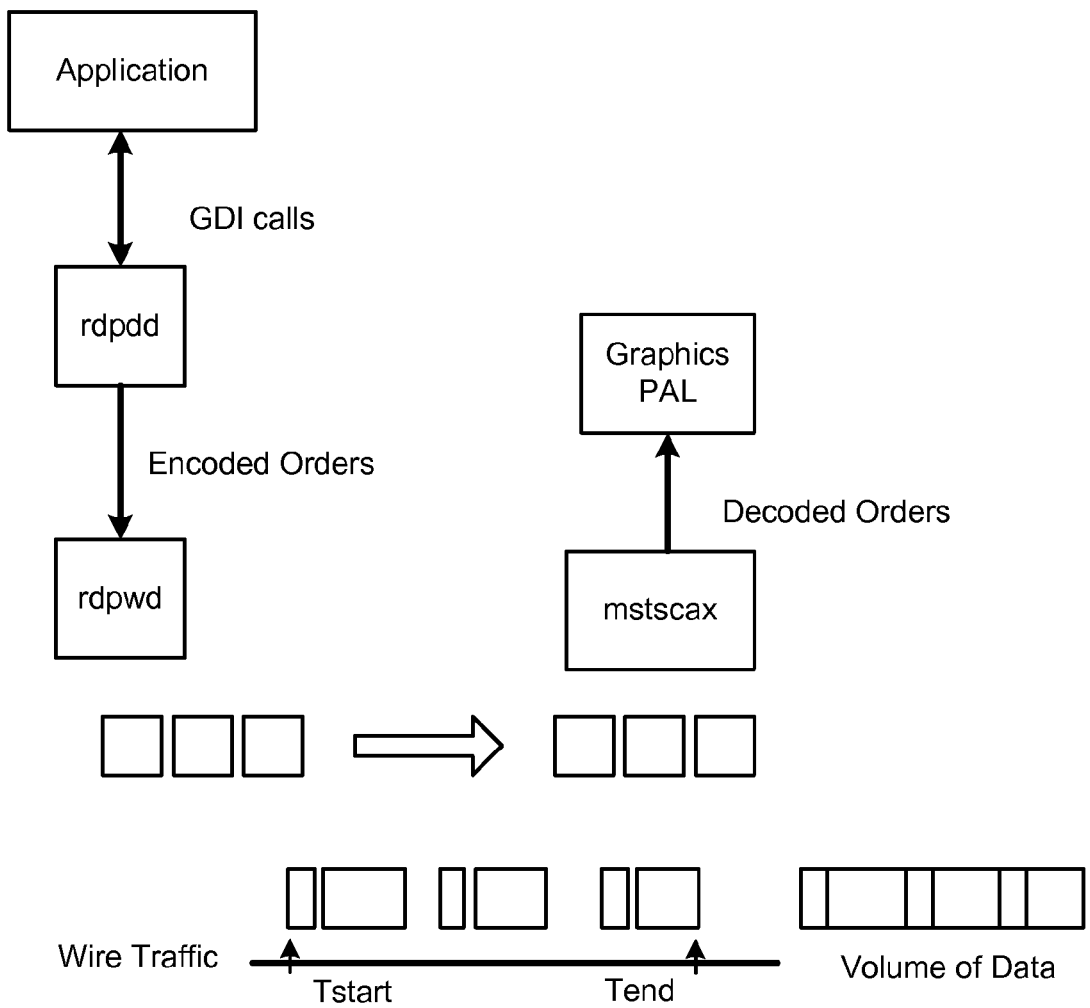
Figure 12:
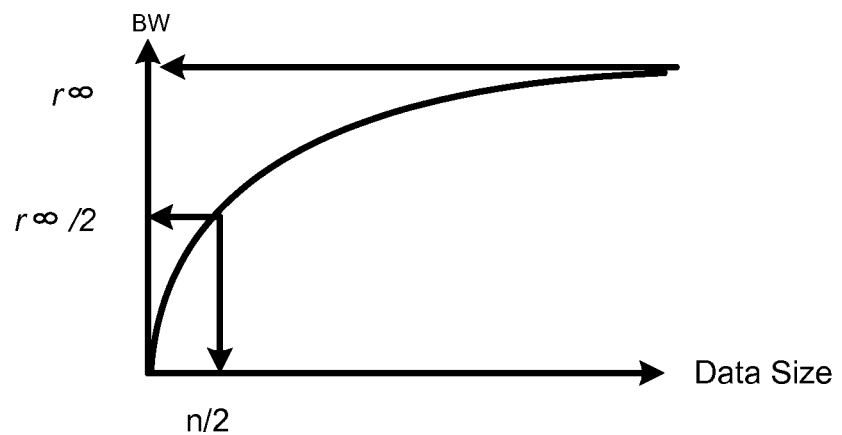

FIG. 11 depicts an example of bandwidth measurement without adding artificial (dummy) data to the data traffic. Here, there is sufficient data flowing from the server to the client to allow for a payload measurement as shown in the figure. The amount of data that needs to measured may vary by network conditions and characteristics, the accuracy of the method used, location in the stack, and stability of any regression function used.

Figure 13:
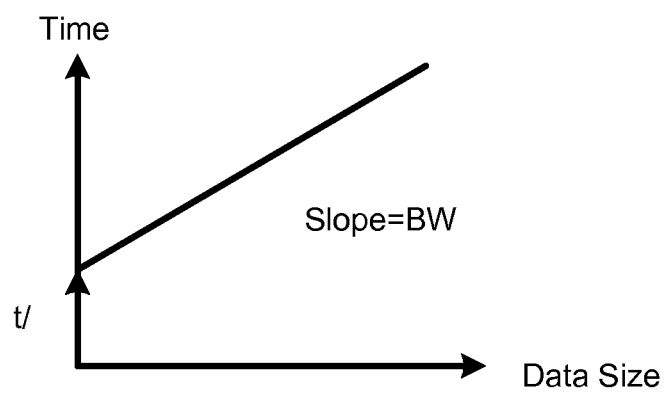

As mentioned previously, one model that can be used for network modeling is the Hockney model which states that latency and bandwidth components are separate and that a network can be modeled on an asymptotic bandwidth profile (linear assumed value). Referring to FIG. 13, $r_{inf}$ is the maximum rate of transfer at infinite data size and r/2 and n/2 are the half maximum rate and datasize (n/2) needed for half maximum rate. These values are characteristics of the entire end-to-end system and may effect how measurements can be accurately made. For example, a one shot measurement would need a n/2 payload and knowledge of what n/2 was in advance. For many WAN systems such as high speed broadband, the ratio of $T_{latency}$ and $T_{BW}$ can be close for typical remote presentation packet sizes.

The figure indicates the relationship between Time and DataSize for delivery of a payload of size 'DataSize'. For example, $$\text{Time} = T_{Latency} + T_{BW}.$$

Figure 14:
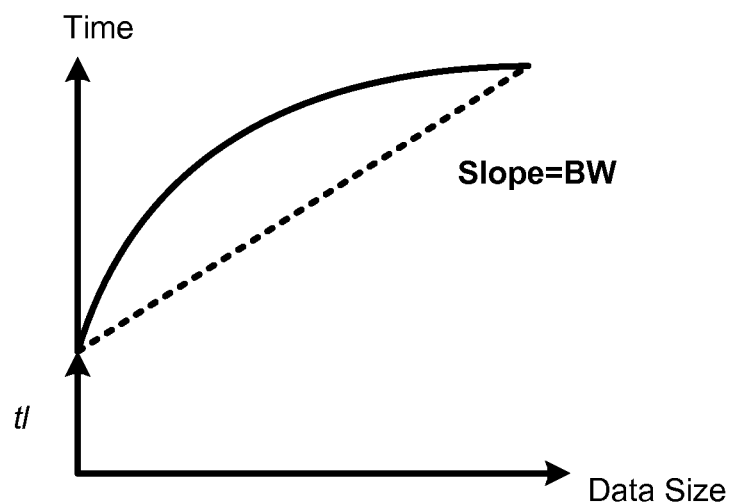

Thus the ratio of $T_{latency}$ to $T_{BW}$ affects the accuracy (or confidence) of a measurement. In some embodiments and as shown in FIG. 14, the slope is not constant and so a bandwidth for different data sizes can be used to model the network (i.e., the modified Hockney model) and can either assumed or determined over time.

As noted above, to control buffer management in remote presentation protocols, it is preferable if a good estimate of both bandwidth and latency is known or that is known that the bandwidth latency product is below or above a predetermined level and that no further tuning can be performed.

In one embodiment, the control algorithm maintains an accurate estimate of bandwidth and latency without injecting unnecessary packet requests into the system. To maintain an accurate estimate, however, the system may request periodic measurements. Accordingly, two limits can be implemented—minimum inject rate and maximum injection rate.

Figure 15:
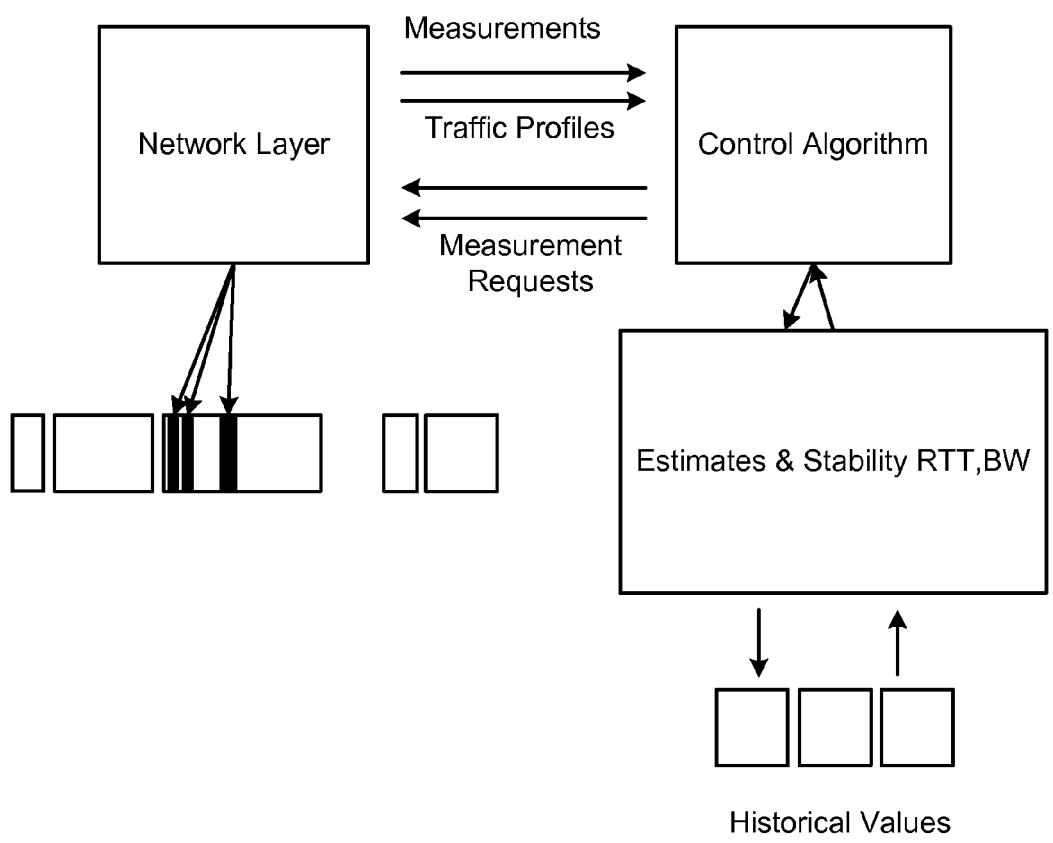

The control algorithm may use a set of rules based on the state of the measurements. In an embodiment and as shown in FIG. 15, the measurement state may consist of the current estimates of latency and bandwidth, their historical values, and the current injection rate and status. To maintain a minimum monitoring frequency, an aging factor may be used with the stability of the latency and bandwidth values to force a periodic measurement.

Figure 16:
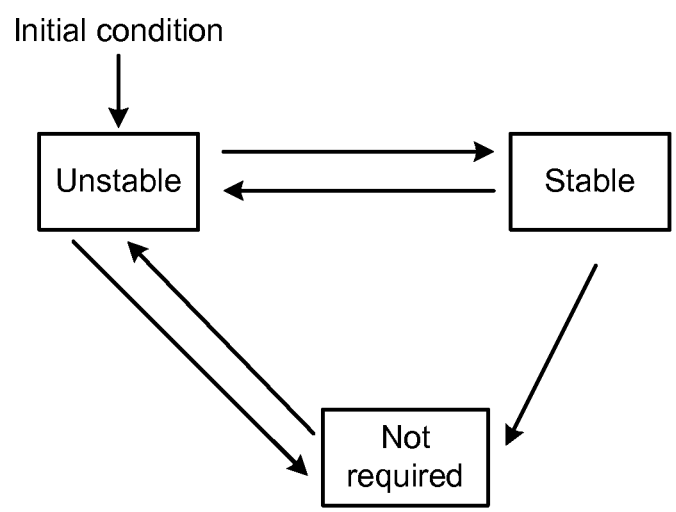

As shown in FIG. 16, in one scenario the states for latency can be stable, unstable and not_required. The state transitions for latency may depend on the stability of current versus previous measurements and the estimated network characteristics. If the network is a local high speed LAN, the latency value can switch into a not_required mode where it is no longer maintained frequently. If the bandwidth deteriorates to a point where is becomes important to determine the latency, the latency state can transition again to unstable to force additional measurements.

If recent measurements contain a variance beyond a pre-determined threshold dependant on the class of the network, then the state of the latency estimate may be switched from stable to unstable. At this point the injection state may be flagged to include active latency measurements. When the latency measurements exhibit a reduced variance then the state may transition to stable. The stable state as discussed above may comprise an aging factor which forces a periodic measurement.

Figure 17:
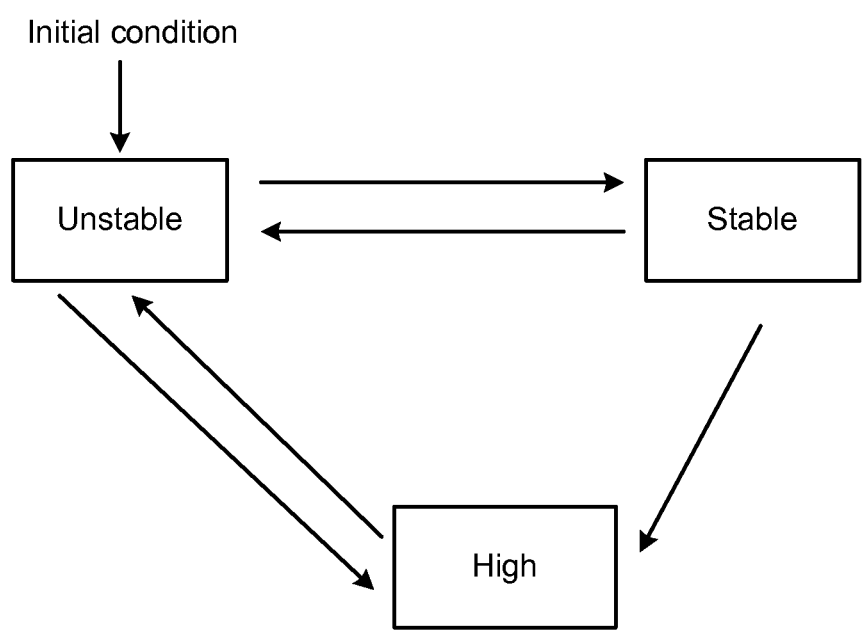

As shown in FIG. 17, in one scenario the states for bandwidth can be stable, unstable, and high. The states for bandwidth may be similar to the states for latency with the exception that "high" indicates that the bandwidth is very high and may not be accurately gauged having already forced a receiver side measurement and the measurement exhibit a high variance. Both stable and high states may comprises aging factors. A high bandwidth state means in effect that the network bandwidth latency product is so high that the default amount of network buffering will allow for adequate performance and user experience.

The aging factors for stable and high states may use a weighted value. The aging value may be incremented each time a stable result is calculated and decremented each time an out of range value is calculated. At each periodic time step the factor may be reduced when the state is stable, which forces a periodic measurement.

Figure 18:
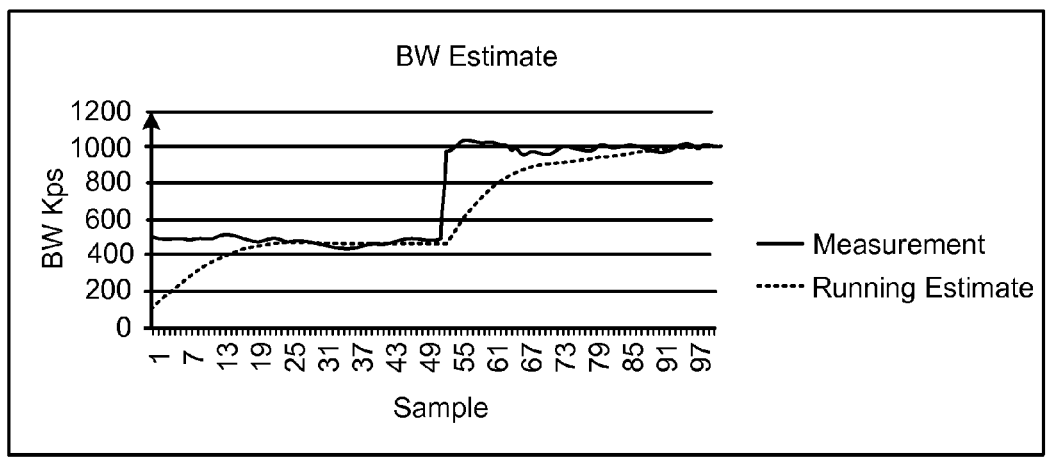

When stable results are calculated, the results may be accumulated via an approximate integral system. In one embodiment, the results may be accumulated using new=old+ (error*factor). The factor value may be tunable. In an embodiment the factor value may be 0.1 during a stable state. FIG. 18 illustrates one example of this effect on a connection with changing bandwidth.

Figure 19:
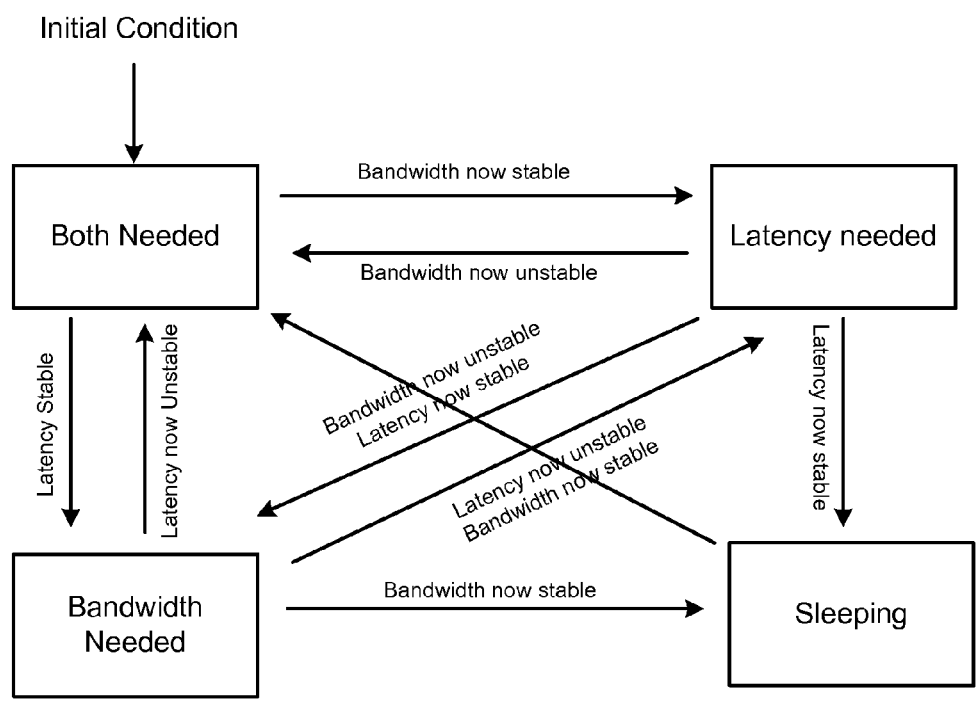

As shown in FIG. 19, the states for measurement injection may be latency needed, bandwidth needed, both needed, and sleeping. When latency measurements are needed the control model may signal to the stack that a measurement is needed that can calculate the RTT. The control model may similarly may signal when a bandwidth is needed except that the control model may request a server or client side measurement based on the current values and network configuration expected (i.e., a high speed LAN may need a client side measurement while a slower link may need a standard Hockney server side measurement). Additionally, the variance of the latency and bandwidth as compared to their relative ratios may also be used to determine how/when to take measurements. For example, in cases where latency varies greatly and the latency is a high ratio compared to bandwidth, receiver side measurements may be requested (e.g., as in a LAN).

The sleeping state may indicate that both latency and bandwidth are stable and that no measurements are currently needed. When the control algorithm is frequently called, the algorithm may use this interaction to age the stability values of latency and bandwidth. When the latency or bandwidth becomes unstable due to aging, the control algorithm may force a needed measurement state for both latency and bandwidth even if one state is still stable.

The type of packet measurement packet request may depend on the states of the latency and bandwidth estimates, current estimate values (which define transport type), and traffic profile reported to the control algorithm by the scheduler.

Figure 20:
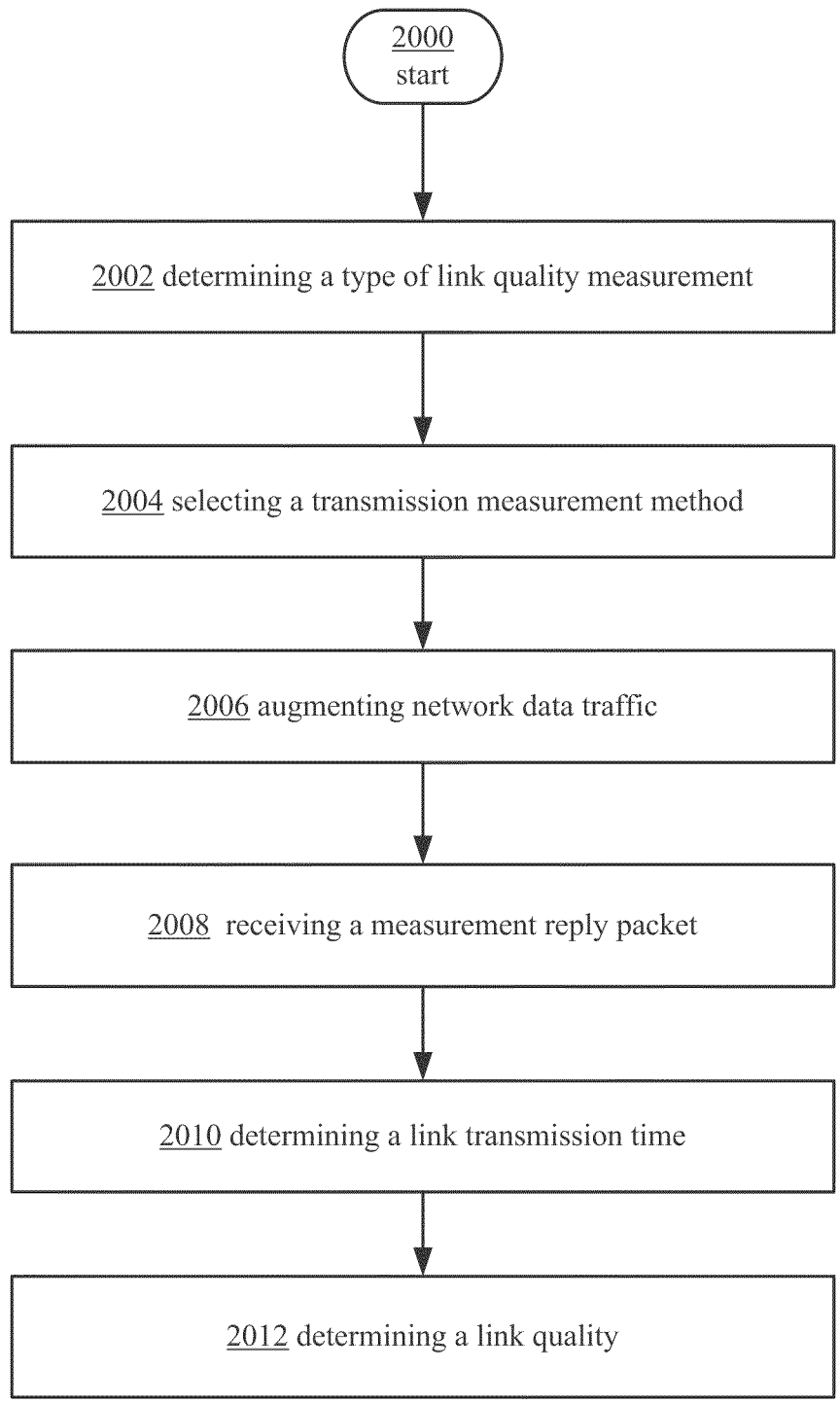
FIG. 20 illustrates an operational procedure incorporating aspects of the methods disclosed herein.

FIG. 20 depicts an exemplary operational procedure for determining link quality between a computing device and a client computing device communicatively coupled over a wide area network using a network protocol including operations 2000, 2002, 2004, 2006, 2008, 2010, and 2012. Referring to FIG. 20, operation 2000 begins the operational procedure and operation 2002 illustrates determining a type of link quality measurement. Operation 2004 illustrates selecting one of a plurality of transmission measurement functions based on said type of link quality measurement and previously determined link conditions. Operation 2006 illustrates augmenting network data traffic between the computing device and the client computing device with a measurement request packet, wherein the contents of the measurement request packet is determined based on the selected transmission measurement method. Operation 2008 illustrates receiving a measurement reply packet from the client computing device. Operation 2010 illustrates determining a link transmission time based on the measurement reply packet. Operation 2012 illustrates determining a link quality based on the link transmission time.

Figure 21:
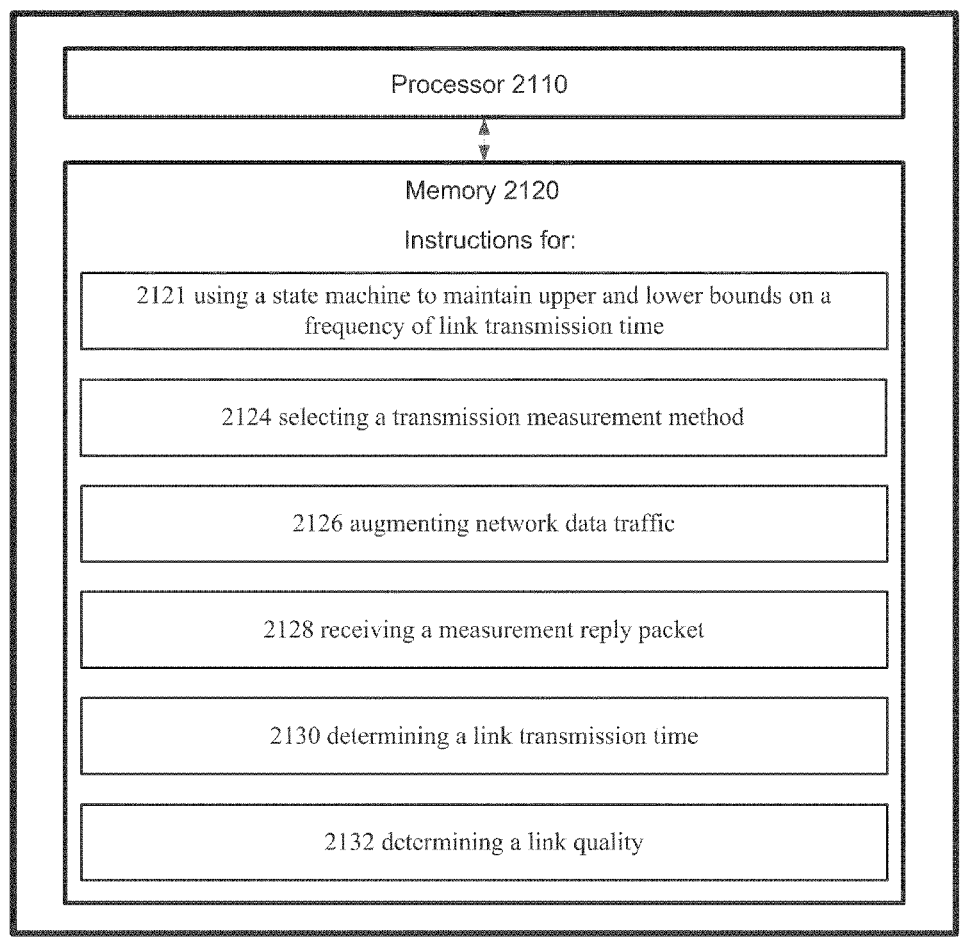
FIG. 21 illustrates an example system for incorporating aspects of the present disclosure.

FIG. 21 depicts an exemplary system for determining link quality between a computing device and a client computing device communicatively coupled over a wide area network using a network protocol as described above. Referring to FIG. 21, system 2100 comprises a processor 2110 and memory 2120. Memory 2120 further comprises computer instructions configured to transmit remote presentation graphics data to a client computer. Block 2122 illustrates using a state machine to maintain upper and lower bounds on a frequency of link transmission time, wherein the state machine is based on current and past link bandwidth and latency estimates. Block 2121 illustrates selecting a transmission measurement method based on a desired type of link quality measurement and previously determined link conditions. Block 2126 illustrates augmenting network data traffic between the computing device and the client computing device with a measurement request packet, wherein the measurement request packet is determined based on the selected transmission measurement method. Block 2128 illustrates receiving a measurement reply packet from the client computing device. Block 2130 illustrates determining a link transmission time based on the measurement reply packet. Block 2132 illustrates determining a link quality based on the link transmission time.

Figure 22:
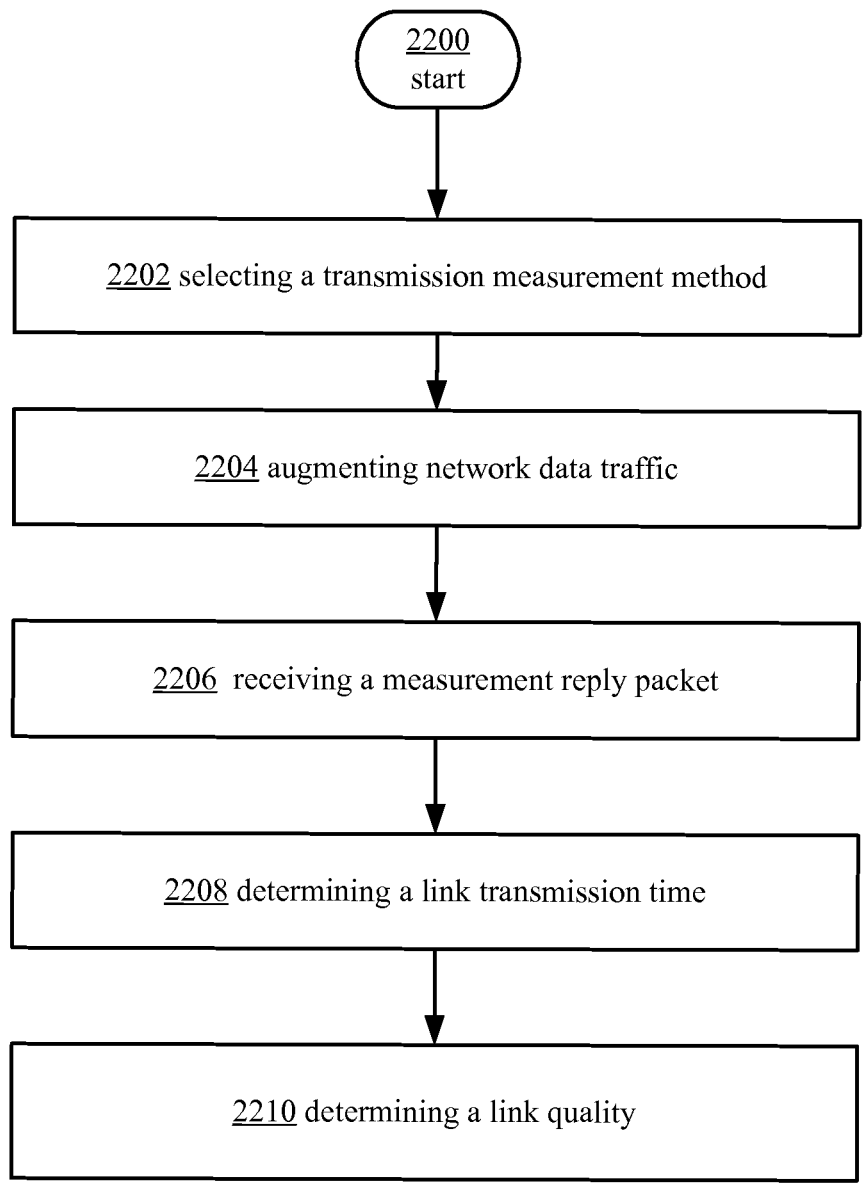
FIG. 22 illustrates an operational procedure incorporating aspects of the methods disclosed herein.

FIG. 22 depicts another exemplary operational procedure for determining link quality between a computing device and a client computing device communicatively coupled over a wide area network using a remote presentation protocol including operations 2200, 2202, 2204, 2206, 2208, and 2210. Referring to FIG. 22, operation 2200 begins the operational procedure and operation 2202 illustrates selecting a transmission measurement method based on a desired type of link quality measurement and previously determined link conditions. Operation 2204 illustrates augmenting network data traffic between the computing device and the client computing device with a measurement request packet, wherein the contents of the measurement request packet is determined based on the selected transmission measurement method. Operation 2206 illustrates receiving a measurement reply packet from the client computing device and operation 2208 illustrates determining a link transmission time based on the measurement reply packet. Operation 2210 illustrates determining a link quality based on the link transmission time.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for determining link quality between a computing device and a client computing device communicatively coupled over a communication network using a network protocol, the method comprising:

determining, in real time, a type of link quality measurement;

selecting one of a plurality of transmission measurement functions, each of the transmission measurement functions implementing a different transmission measurement methodology, based on said type of link quality measurement and determined link conditions;

augmenting network data traffic between the computing device and the client computing device with a measurement request packet, wherein the contents of the measurement request packet is determined based on the selected transmission measurement function;

receiving a measurement reply packet from the client computing device;

determining a link transmission time based on the measurement reply packet; and determining, in real time, a link quality based on the link transmission time.

2. The method of claim 1, wherein the plurality of transmission measurement functions comprises one of ping-pong, payload weighted ping-pong, packet pairing and packet pairing with payload.

3. The method of claim 1, further comprising adjusting a run-time tuning of a remote presentation session between the client computing device and the computing device using the link quality.

4. The method of claim 1, wherein the link quality comprises latency and bandwidth.

5. The method of claim 1, wherein request and reply transactions between the server and the client are timed.

6. The method of claim 1, wherein a set of packets are echoed back to the computing device.

7. The method of claim 1, wherein the plurality of transmission measurement functions comprises packet pairing and receiver side measurement and request packets are injected at the computing device and timing is performed at the client computing device.

8. The method of claim 1, wherein the link quality is determined using Hockney network modeling.

9. The method of claim 1, further comprising using a state machine to maintain upper and lower bounds on a frequency of link transmission time, wherein the state machine is based on current and past link bandwidth and latency estimates.

10. A system configured to determine a link quality between a computing device and a client computing device communicatively coupled over a communication network using a network protocol, comprising:

at least one processor; and at least one memory communicatively coupled to said at least one processor when the system is operational, the memory having stored therein computer-executable instructions that, upon execution by the processor, cause:

using a state machine to maintain upper and lower bounds on a frequency of link transmission time, wherein the state machine is based on current and past link bandwidth and latency estimates;

selecting, in real time, a transmission measurement method based on a desired type of link quality measurement and previously determined link conditions;

augmenting network data traffic between the computing device and the client computing device with a measurement request packet, wherein the measurement request packet is determined based on the selected transmission measurement method;

receiving a measurement reply packet from the client computing device;

determining a link transmission time based on the measurement reply packet; and determining, in real time, a link quality based on the link transmission time.

11. The system of claim 10, wherein the state machine states start at an unstable state and migrate to one of a Not Needed or High state as a function of the measurements.

12. The system of claim 10, further comprising a progressive time and traffic based decay function that reduces the stable state to an unstable state.

13. The system of claim 10, wherein changes to the state use an integral approximation to update values of a form new=old+(error*factor).

14. The system of claim 13 wherein the factor is approximately 1/10.

15. The system of claim 10 wherein when the network is a local high speed LAN the latency value is set to a not required mode.

16. The system of claim 10 wherein when the measurements contain a variance above a predetermined threshold dependent on the class of the network, the state of the latency estimate is changed from stable to unstable.

17. A method for determining link quality between a computing device and a client computing device communicatively coupled over a communication network using a remote presentation protocol, the method comprising:

selecting, in real time, a transmission measurement method, from a plurality of available transmission measurement methods each implementing a different transmission measurement methodology, based on a desired type of link quality measurement and previously determined link conditions;

augmenting network data traffic between the computing device and the client computing device with a measurement request packet, wherein the measurement request packet is determined based on the selected transmission measurement method;

receiving a measurement reply packet from the client computing device;

determining a link transmission time based on the measurement reply packet; and determining, in real time, a link quality based on the link transmission time.

18. The method of claim 17, further comprising using a state machine to maintain upper and lower bounds on a frequency of link transmission time, wherein the state machine is based on current and past link bandwidth and latency estimates.

19. The method of claim 17, wherein the link quality comprises latency and bandwidth.

20. The method of claim 19, wherein the latency is determined by the round trip time (RTT).

* * * * *